US012578747B2

(12) United States Patent
Park

(10) Patent No.: US 12,578,747 B2
(45) Date of Patent: Mar. 17, 2026

(54) ALWAYS-ON LOW-DROPOUT (LDO) REGULATOR FOR COIN-CELL-BASED WIRELESS LOCAL AREA NETWORK (WLAN) DEVICE

(71) Applicant: QUALCOMM Incorporated, San Diego, CA (US)

(72) Inventor: Sunghyun Park, Campbell, CA (US)

(73) Assignee: Qualcomm Incorporated, San Diego, CA (US)

( * ) Notice: Subject to any disclaimer, the term of this patent is extended or adjusted under 35 U.S.C. 154(b) by 223 days.

(21) Appl. No.: 18/446,338

(22) Filed: Aug. 8, 2023

(65) Prior Publication Data

US 2024/0053784 A1 Feb. 15, 2024

Related U.S. Application Data

(60) Provisional application No. 63/491,692, filed on Mar. 22, 2023, provisional application No. 63/370,883, filed on Aug. 9, 2022.

(51) Int. Cl.
*G05F 1/575* (2006.01)
*G05F 1/618* (2006.01)

(52) U.S. Cl.
CPC .................................... *G05F 1/575* (2013.01)

(58) Field of Classification Search
CPC ................................. G05F 1/618; G05F 1/575
See application file for complete search history.

(56) References Cited

U.S. PATENT DOCUMENTS

2009/0085535 A1 4/2009 Wei
2009/0086517 A1* 4/2009 Wei ....................... H02M 3/156 363/50
2013/0229213 A1* 9/2013 Park ........................ H03L 7/093 327/157
2014/0103890 A1 4/2014 Naidu et al.
2021/0028687 A1 1/2021 Ortet et al.
2022/0224233 A1 7/2022 Yang et al.
2024/0055991 A1* 2/2024 Park .................... H02M 1/0019
2024/0178688 A1* 5/2024 Binder .............. H02J 7/007182
2024/0313568 A1* 9/2024 Kang .................... H01M 10/44

OTHER PUBLICATIONS

International Search Report and Written Opinion—PCT/US2023/071912—ISA/EPO—Dec. 22, 2023.

* cited by examiner

*Primary Examiner* — Sisay G Tiku
(74) *Attorney, Agent, or Firm* — Patterson & Sheridan LLP

(57) ABSTRACT

Techniques and apparatus for operating an always-on low-dropout (LDO) voltage regulator during cold boot and different sleep mode scenarios for a device including the LDO regulator. The LDO regulator may be disposed, for example, in a wireless local area network (WLAN) device powered by a coin cell battery. One example apparatus may be an integrated circuit (IC), which may be disposed in such a WLAN device and/or may be a power management unit (PMU). The IC generally includes a first port for coupling to a battery, a second port, a switched-mode power supply (SMPS) including a power supply input coupled to the second port, and an LDO regulator including a power supply input selectively coupled to the first port or to an output of the SMPS.

26 Claims, 5 Drawing Sheets

ALWAYS-ON LOW-DROPOUT (LDO) REGULATOR FOR COIN-CELL-BASED WIRELESS LOCAL AREA NETWORK (WLAN) DEVICE

CROSS-REFERENCE TO RELATED APPLICATION(S)

This application claims the benefit of and priority to U.S. Provisional Application No. 63/370,883, filed Aug. 9, 2022, and U.S. Provisional Application No. 63/491,692, filed Mar. 22, 2023, which are expressly incorporated by reference herein in their entireties as if fully set forth below and for all applicable purposes.

TECHNICAL FIELD

Certain aspects of the present disclosure generally relate to electronic circuits and, more particularly, to a low-dropout (LDO) voltage regulator, which may be included in a wireless local area network (WLAN) device powered by a coin cell battery.

BACKGROUND

A voltage regulator provides a constant direct current (DC) output voltage regardless of changes in load current or input voltage. Voltage regulators may be classified as either linear regulators or switching regulators. While linear regulators tend to be small and compact, many applications may benefit from the increased efficiency of a switching regulator. A linear regulator may be implemented by a low-dropout (LDO) regulator, for example. A switching regulator may be implemented by a switched-mode power supply (SMPS), such as a buck converter, a boost converter, a buck-boost converter, or a charge pump.

For example, a buck converter is a type of SMPS typically comprising: (1) a high-side switch coupled between a relatively higher voltage rail and a switching node, (2) a low-side switch coupled between the switching node and a relatively lower voltage rail, (3) and an inductor coupled between the switching node and a load (e.g., represented by a shunt capacitive element). The high-side and low-side switches may be implemented with transistors, although the low-side switch may alternatively be implemented with a diode.

Power management units (PMUs) are used for managing the power requirement of a host system and may include and/or control one or more voltage regulators (e.g., LDOs and/or SMPSs). A PMU may be used in battery-operated devices, such as mobile phones, tablets, laptops, wearables, etc., to control the flow and direction of electrical power in the devices. The PMU may perform a variety of functions for the device such as DC-to-DC conversion (e.g., using a voltage regulator as described above), battery charging, power-source selection, voltage scaling, power sequencing, etc.

SUMMARY

The systems, methods, and devices of the disclosure each have several aspects, no single one of which is solely responsible for its desirable attributes. Without limiting the scope of this disclosure as expressed by the claims that follow, some features are discussed briefly. After considering this discussion, and particularly after reading the section entitled "Detailed Description," one will understand how the features of this disclosure provide the advantages described herein.

Certain aspects of the present disclosure generally relate to a wireless local area network (WLAN) device comprising an always-on low-dropout (LDO) voltage regulator and a coin cell battery coupled to and configured to power the LDO voltage regulator.

Certain aspects of the present disclosure generally relate to techniques for operating an always-on low-dropout (LDO) voltage regulator during cold boot and sleep modes for a device including the LDO regulator. The LDO regulator may be disposed, for example, in a WLAN device powered by a coin cell battery.

Certain aspects of the present disclosure provide an integrated circuit (IC) for power management. The IC generally includes a first port for coupling to a battery, a second port, a switched-mode power supply (SMPS) including a power supply input coupled to the second port, and an LDO regulator including a power supply input selectively coupled to the first port or to an output of the SMPS.

Certain aspects of the present disclosure provide a WLAN device comprising the IC described herein.

Certain aspects of the present disclosure provide a method for managing power in an IC. The IC generally includes an LDO regulator and an SMPS. The method generally includes: during a cold boot of the IC, coupling a power supply input of the LDO regulator to a battery input of the IC, such that the LDO regulator is powered by a battery for the cold boot; and after the cold boot of the IC, coupling the power supply input of the LDO regulator to an output of the SMPS, such that the LDO regulator is powered by the SMPS.

Certain aspects of the present disclosure provide a non-transitory computer-readable medium encoding logic that, when executed by at least one processor of a device, cause the device to perform a method for managing power in an IC, the IC including an LDO regulator and an SMPS. The method generally includes: during a cold boot of the IC, coupling a power supply input of the LDO regulator to a battery input of the IC, such that the LDO regulator is powered by a battery for the cold boot; and after the cold boot of the IC, coupling the power supply input of the LDO regulator to an output of the SMPS, such that the LDO regulator is powered by the SMPS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Device

It should be understood that aspects of the present disclosure may be used in a variety of applications. Although the present disclosure is not limited in this respect, the circuits disclosed herein may be used in any of various suitable apparatus, such as in the power supply, battery charging circuit, or power management circuit of a communication system, a video codec, audio equipment such as music players and microphones, a television, camera equipment, and/or test equipment such as an oscilloscope. Communication systems intended to be included within the scope of the present disclosure include, by way of example only, cellular radiotelephone communication systems, satellite communication systems, two-way radio communication systems, one-way pagers, two-way pagers, personal communication systems (PCS s), personal digital assistants (PDAs), Internet of Things (IoT) devices, and the like.

Figure 1:
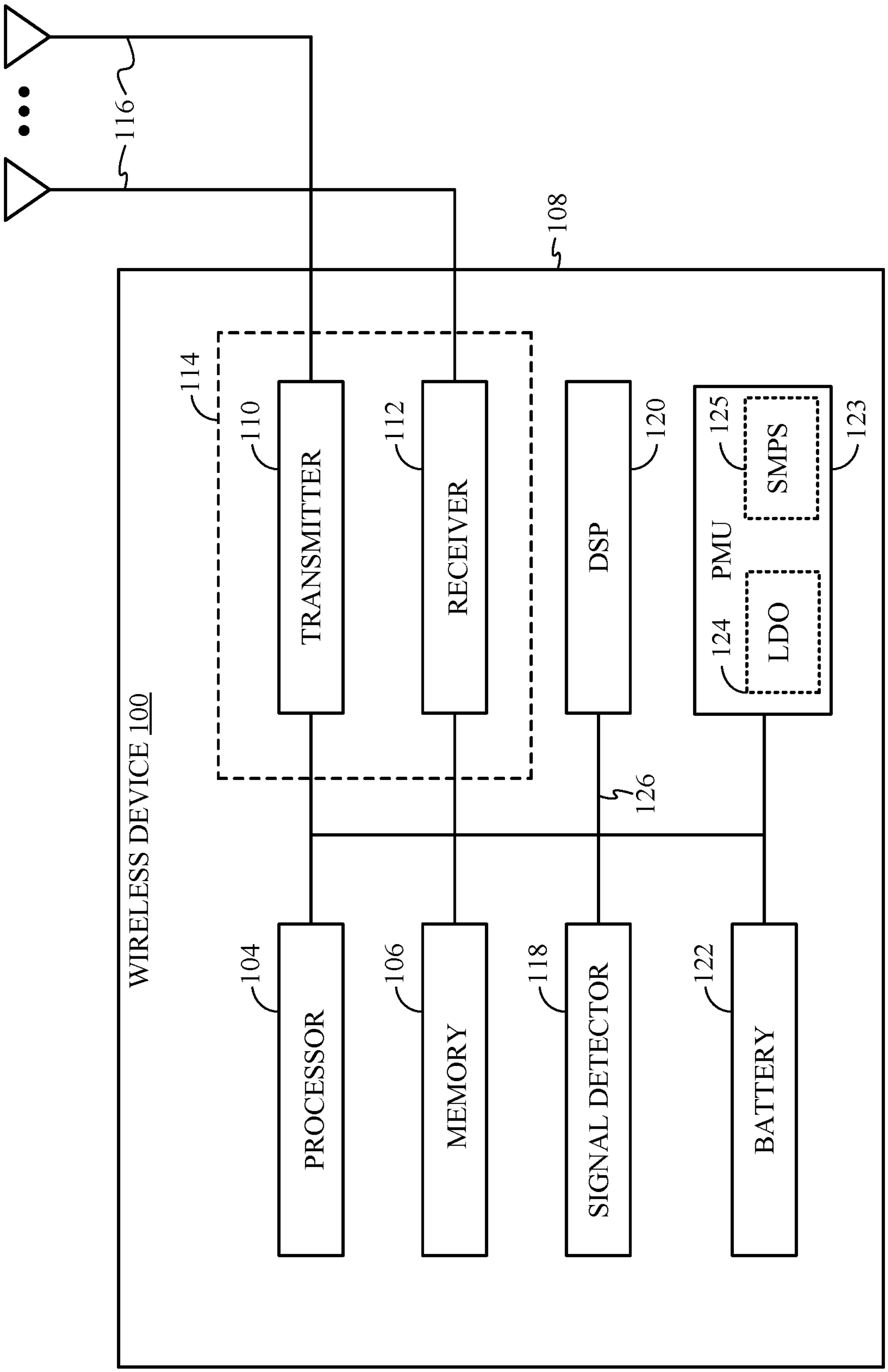
FIG. 1 is a block diagram of an example device that includes a battery coupled to a power management unit (PMU), in accordance with certain aspects of the present disclosure.

FIG. 1 illustrates an example device 100 in which aspects of the present disclosure may be implemented. The device 100 may be a battery-operated device such as a cellular phone, a PDA, a handheld device, a wireless device, a laptop computer, a tablet, a smartphone, a wearable device, an augmented reality device, etc.

The device 100 may include a processor 104 that controls operation of the device 100. The processor 104 may also be referred to as a central processing unit (CPU). Memory 106, which may include both read-only memory (ROM) and random access memory (RAM), provides instructions and data to the processor 104. A portion of the memory 106 may also include non-volatile random access memory (NVRAM). The processor 104 typically performs logical and arithmetic operations based on program instructions stored within the memory 106.

In certain aspects, the device 100 may also include a housing 108 that may include a transmitter 110 and a receiver 112 to allow transmission and reception of data between the device 100 and a remote location. For certain aspects, the transmitter 110 and receiver 112 may be combined into a transceiver 114. One or more antennas 116 may be attached or otherwise mechanically coupled to the housing 108 and electrically coupled to the transceiver 114. The device 100 may also include (not shown) multiple transmitters, multiple receivers, and/or multiple transceivers.

The device 100 may also include a signal detector 118 that may be used in an effort to detect and quantify the level of signals received by the transceiver 114. The signal detector 118 may detect such signal parameters as total energy, energy per subcarrier per symbol, and power spectral density, among others. The device 100 may also include a digital signal processor (DSP) 120 for use in processing signals.

The device 100 may further include a battery 122 used to power the various components of the device 100. For certain aspects, the battery 122 may be a coin cell battery, such as a CR2032 battery, which is a round lithium battery and may be capable of delivering 220 milliampere hours (mAh).

The device 100 may also include a power management unit (PMU) 123 for managing the power from the battery to the various components of the device 100. At least a portion of the PMU 123 may be implemented in one or more power management integrated circuits (power management ICs or PMICs). The PMU 123 may perform a variety of functions for the device 100 such as DC-to-DC conversion, battery charging, power-source selection, voltage scaling, power sequencing, etc. For example, the PMU 123 may include a battery charging circuit (e.g., a master-slave battery charging circuit) for charging the battery 122. The PMU 123 may include one or more power supply circuits, which may include at least one low-dropout (LDO) voltage regulator 124 and/or at least one switched-mode power supply (SMPS) 125. The switched-mode power supply may be implemented by any of various suitable switched-mode power supply circuit topologies, such as a buck converter, a boost converter, a buck-boost converter, or a charge pump.

The various components of the device 100 may be coupled together by a bus system 126, which may include a power bus, a control signal bus, and/or a status signal bus in addition to a data bus. Additionally or alternatively, various combinations of the components of the device 100 may be coupled together by one or more other suitable techniques.

Example Device with Always-on LDO

Micro-power Wi-Fi technology (e.g., under the IEEE 802.11 family of standards, such as IEEE 802.11n) enables Wi-Fi devices to run under coin cell batteries (e.g., CR2032 batteries) and achieve usable battery life. For certain aspects, such micro-power Wi-Fi technology may be utilized for extended personal area network (XPAN) applications.

In the case of micro-power Wi-Fi, a wireless local area network (WLAN) integrated circuit (IC) may be powered by a single coin cell battery. It may be desirable to provide a regulated voltage (e.g., from a PMU) that is always on in various sleep mode conditions for the device. This regulated voltage may mainly be used to hold the status of a number of logic gates in the WLAN IC (e.g., the system on a chip (SoC)) and the PMU, to provide for fast switching of the device from sleep mode. An always-on regulator providing this voltage should ideally have minimum current consumption.

Figure 2:
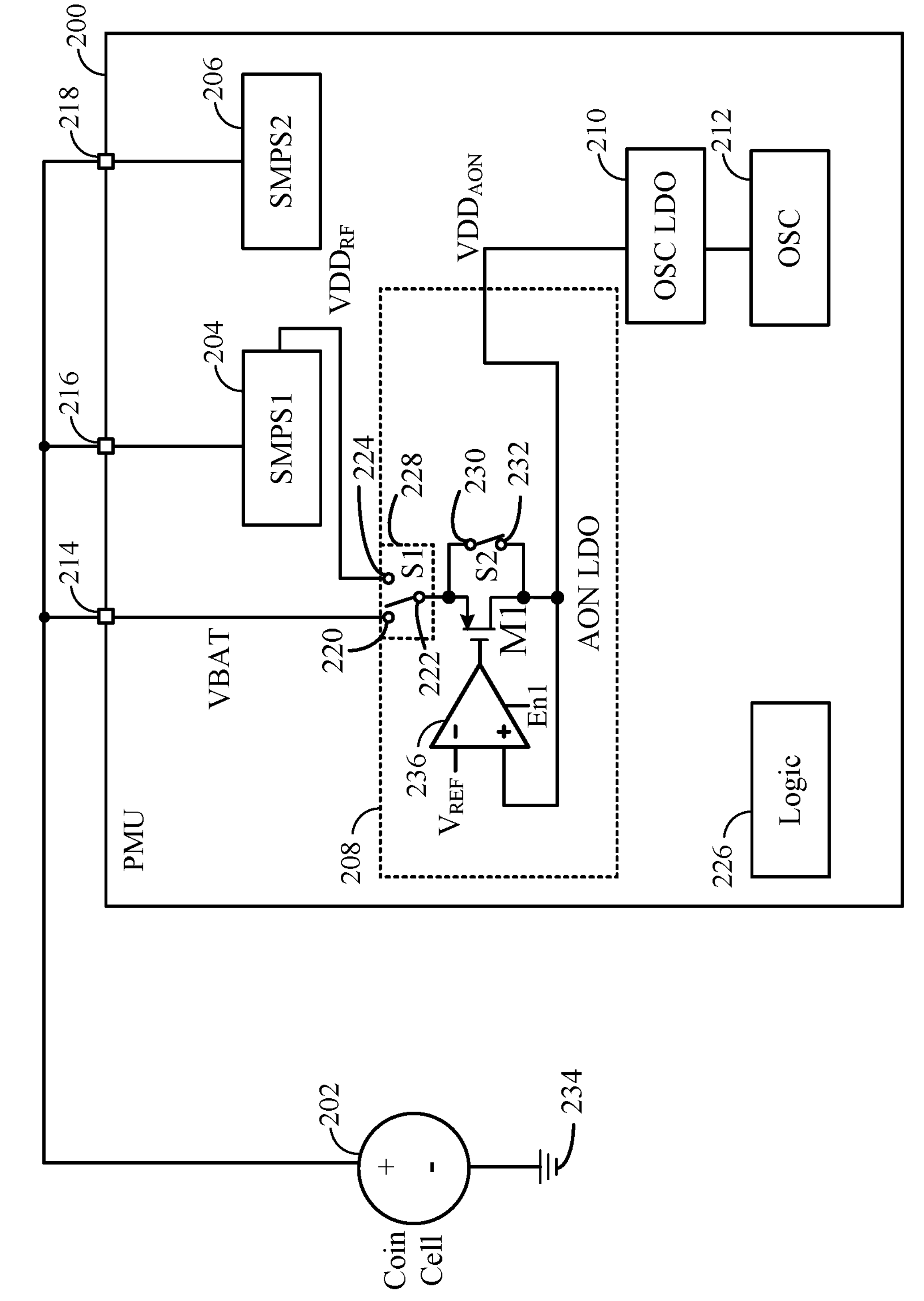
FIG. 2 is a block diagram of an example PMU powered by a coin cell battery, in accordance with certain aspects of the present disclosure.

FIG. 2 is a block diagram of an example PMU 200 powered by a coin cell battery 202, in accordance with certain aspects of the present disclosure. The PMU 200 may include at least one switched-mode power supply (e.g., a first switched-mode power supply (SMPS) 204 labeled "SMPS1" and a second SMPS 206 labeled "SMPS2"). SMPS1 and SMPS2 may each be configured to generate a regulated voltage based on power from the coin cell battery 202. The PMU 200 may also include an always-on low-dropout regulator (AON LDO) 208, an oscillator low-dropout (LDO) regulator 210 (labeled "OSC LDO"), an oscillator 212 (labeled "OSC"), and logic 226. The oscillator 212 may be used as a sleep mode clock source, powered by a regulated voltage generated by the oscillator LDO regulator 210 and configured to generate a clock signal (e.g., for the sleep mode).

The PMU 200 may include a first port 214, a second port 216, and a third port 218. As illustrated in FIG. 2, each of the ports 214, 216, 218 is coupled to a positive terminal of the coin cell battery 202. In some cases, the first port 214 and the second port 216 may be the same port, whereas in other cases, these ports 214, 216 may be shorted external to the PMU 200, as shown. The negative terminal of the coin cell battery 202 may be coupled to a reference potential node 234 (e.g., electrical ground). The SMPS 204 may have a power supply input coupled to the second port 216, and the SMPS 206 may have a power supply input coupled to the third port 218.

The AON LDO 208 may include a first switch S1, a second switch S2, a pass transistor M1, and an amplifier 236 (e.g., an error amplifier). Switch S1 may be a single-pole, double-throw (SPDT) switch, as shown. Switch S1 may alternatively be implemented in various other suitable ways. Transistor M1 may be a metal-oxide-semiconductor field-effect transistor (MOSFET), which may be a p-type transistor (as shown) or an n-type transistor. Switch S2 may be referred to as a bypass switch, and may be configured to bypass transistor M1. Alternatively, switch S2 may not be included in the AON LDO 208, and the function of switch S2 may be implemented by clamping a gate voltage of transistor M1 to a higher voltage. The AON LDO 208 may have a power supply input 228 that effectively includes or is implemented by switch S1, as illustrated in FIG. 2. Switch S1 may include a first terminal 220 coupled to the first port 214 (with a battery voltage labeled "VBAT" from the coin cell battery 202), a second terminal 224 coupled to an output of the SMPS 204 (e.g., a radio frequency (RF) circuit power supply rail voltage labeled "$VDD_{RF}$"), and a third terminal 222 coupled to the source of transistor M1, which may alternatively be considered as (or be coupled to) the power supply input of the AON LDO 208. The third terminal 222 of switch S1 may be configured to be selectively coupled to the first port 214 via the first terminal 220 or to the output of SMPS1 via the second terminal 224.

Also referred to as a "pass transistor" of the AON LDO 208, transistor M1 may have a source coupled to the third terminal 222 and a first terminal 230 of switch S2. The transistor M1 may also have a gate coupled to the output of the amplifier 236 and a drain coupled to a positive input of the amplifier 236 and to an output of the AON LDO 208 (e.g., output rail voltage labeled "$VDD_{AON}$"). The output of the AON LDO 208 may be coupled to the oscillator LDO regulator 210 and the oscillator 212, as illustrated. A negative input of the amplifier 236 may be coupled to a reference voltage node (labeled "$V_{REF}$") with a reference voltage for the AON LDO 208.

The logic 226 may be configured to provide the control signals for the switches (e.g., switch S1 and switch S2) and/or control other aspects of the PMU 200. The logic 226 may also provide the enable signals for various components, such as the amplifier 236 (e.g., an enable signal labeled "En1"), SMPS1, and SMPS2.

The AON LDO 208 may be specified to operate under various input supply conditions, while consuming minimum, or at least reduced, current. In some cases, during cold boot (e.g., of the WLAN IC), the AON LDO 208 may directly use the battery supply voltage (e.g., from the coin cell battery 202 and labeled "VBAT"), as this voltage may be the only available voltage source. For example, switch S1 may be controlled to select the first terminal 220, and the power supply input 228 may receive the battery supply voltage at the first terminal 220, such that the AON LDO 208 is powered by the coin cell battery 202. During the cold boot, one or more of the SMPS 204 and the SMPS 206 may be enabled (e.g., by an enable signal, not shown) after the AON LDO 208 is enabled (e.g., by the En1 signal).

In certain aspects, the PMU 200 may be configured to enter a sleep mode for the device. To enter a sleep mode when RF circuit power supply rail voltage from the SMPS 204 is available, the power supply input 228 of the AON LDO 208 may be coupled to the output of the SMPS 204 (e.g., via switch S1), switch S2 (e.g., controlled by the logic 226) may be closed to bypass transistor M1, and the AON LDO 208 may be disabled (e.g., by the En1 signal). In some cases, switch S2 may be closed after a delay when the sleep mode is entered. In some cases, to enter the sleep mode, the SMPS 204 may boost its output voltage ($VDD_{RF}$) before switch S2 is closed, and the SMPS 204 may subsequently enter a low power mode (e.g., for a duration of the sleep mode).

In certain aspects, to exit the sleep mode for the device, switch S2 may be opened (e.g., controlled by the logic 226), and the AON LDO 208 may be enabled (e.g., by the En1 signal). In some cases, switch S2 may be opened after a delay. To exit the sleep mode, the SMPS 204 may exit from a lower power mode and enter a pulse-frequency modulation (PFM) mode or a pulse-width modulation (PWM) mode, before switch S2 is opened.

During the sleep mode, the AON LDO 208 may consume as little current as possible, with or without other on-chip regulators enabled, and with or without a sleep clock signal (e.g., from the oscillator 212) enabled. For example, the target current consumption may be on the order of 100 nA.

In order to meet these design specifications during the cold boot, the AON LDO 208 and a regulator (e.g., SMPS1) for generating $VDD_{RF}$ may be enabled sequentially, according to certain aspects of the present disclosure. Once the cold boot is completed, the power supply input 228 of the AON LDO 208 may be switched from the coin cell battery voltage (e.g., via the first terminal 220 of switch S1) to the output voltage of SMPS1 (e.g., via the second terminal 224 of switch S1) using switch S1. That is, the AON LDO 208 may be configured to use the switch S1 (e.g., controlled by the logic 226) to couple the source of the pass transistor to the output of SMPS1 and start to use regulated voltage from SMPS1, to reduce battery-referred power consumption. That is, the third terminal 222 of switch S1 may be coupled to the second terminal 224, and the power supply input 228 may receive the regulated voltage $VDD_{RF}$, such that the AON LDO 208 is powered by SMPS1. Both hardware- and software-based controls for the operations described herein may be available.

Entering the sleep mode may involve two different scenarios: (1) $VDD_{RF}$ and a system sleep clock are available and (2) sources of $VDD_{RF}$ and the system clock (e.g., SMPS1 and the oscillator 212, respectively) are powered down.

Figure 3:
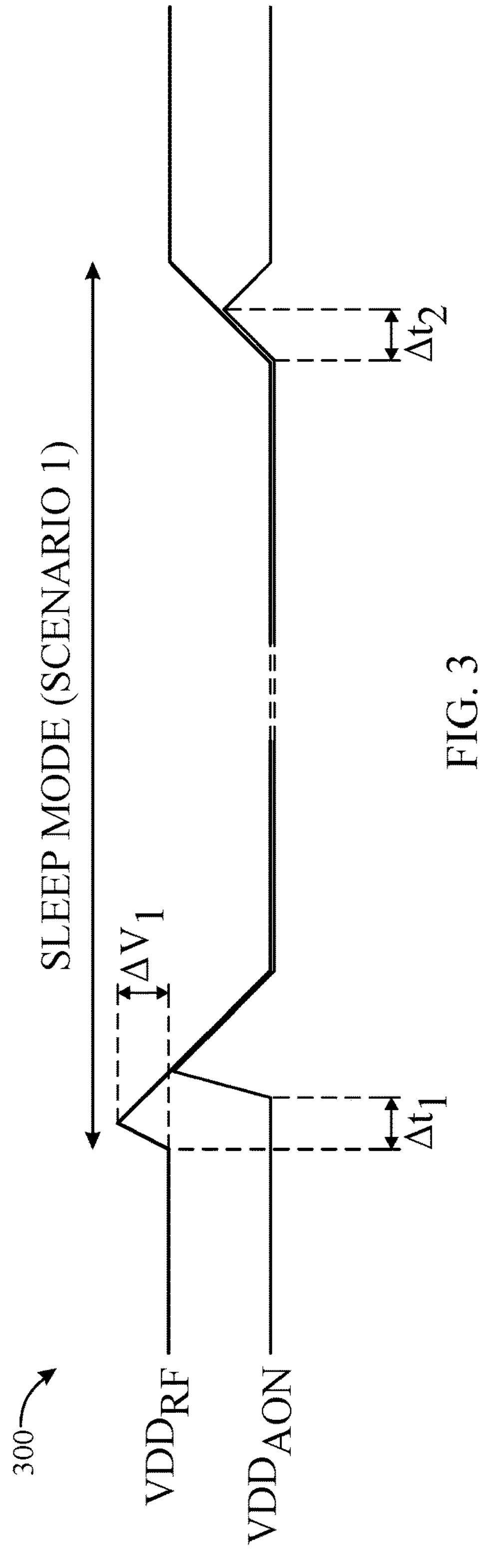
FIGS. 3 and 4 illustrate different sleep mode scenarios for an always-on low-dropout (AON LDO) voltage regulator, in accordance with certain aspects of the present disclosure.

FIG. 3 is an example plot 300 of the first sleep mode scenario (labeled "Scenario 1"), in which $VDD_{RF}$ and the sleep clock are available, in accordance with certain aspects of the present disclosure. Before entering the sleep mode, SMPS1 may be operating in a pulse-frequency modulation (PFM) mode or a pulse-width modulation (PWM) mode to regulate $VDD_{RF}$. To enter the sleep mode in this scenario, the AON LDO passgate (e.g., transistor M1) may be bypassed (e.g., by closing switch S2), and a controller (e.g., the amplifier 236) of the AON LDO 208 may be disabled, such that the output of the AON LDO 208 ($VDD_{AON}$) may be effectively shorted to the output of SMPS1 ($VDD_{RF}$). For certain aspects, SMPS1 may boost $VDD_{RF}$ by a voltage increment $\Delta V_1$ before the switch is closed. Additionally or alternatively for certain aspects, the passgate may be bypassed after a delay $\Delta t_1$, which may begin as soon as entering the sleep mode is triggered (or begin from the time when SMPS1 begins boosting $VDD_{RF}$).

During the sleep mode, SMPS1 may enter a low power mode with a lower output voltage than the normal regulated voltage for $VDD_{RF}$. Furthermore, the AON LDO 208 may consume only leakage current during the sleep mode.

To exit the sleep mode, SMPS1 may exit from the lower power mode and start to ramp up its output voltage $VDD_{RF}$. For example, SMPS1 may enter a pulse-frequency modulation (PFM) mode or a pulse-width modulation (PWM) mode. In addition, the AON LDO 208 may be enabled (e.g., by the Ent signal at the amplifier 236), and switch S2 may be opened (e.g., controlled by the logic 226). In some cases, switch S2 may be opened after a delay $\Delta t_2$ from the start of $VDD_{RF}$ ramping back up. Once switch S2 is opened, the output of the AON LDO 208 ($VDD_{AON}$) is no longer effectively shorted to the output of SMPS1 ($VDD_{RF}$), and the two signals have different voltage levels, as shown.

Parameters related to sleep transitions (e.g., $\Delta V_1$, $\Delta t_1$, and $\Delta t_2$ as shown in FIG. 3) can be adjusted by software, prior to entering the sleep mode, which may improve design robustness.

Figure 4:
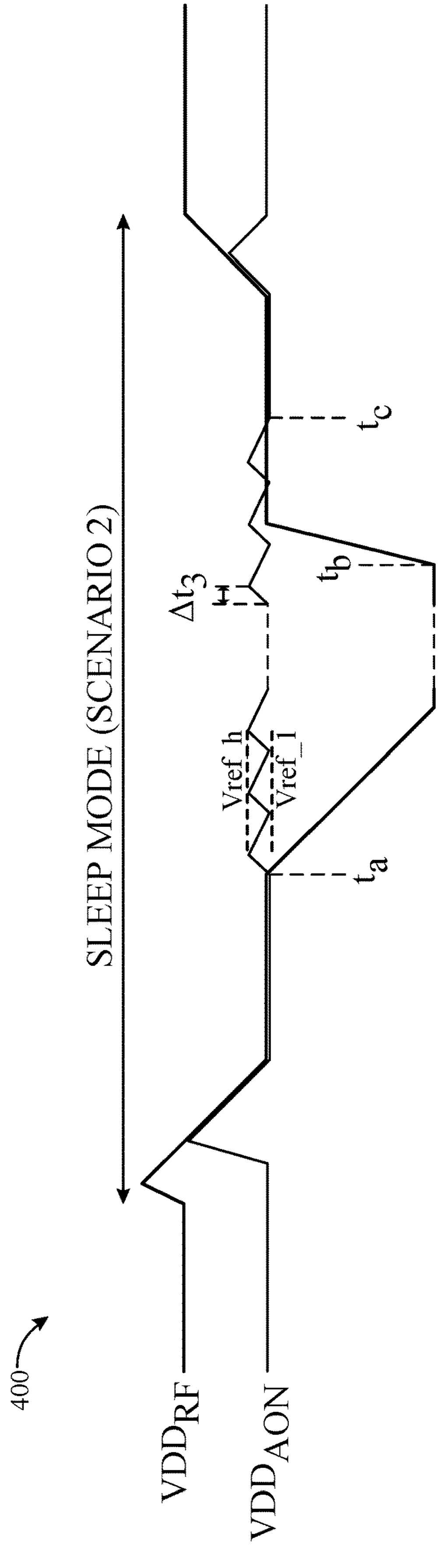

FIG. 4 is an example plot 400 of the second sleep mode scenario (labeled "Scenario 2"), in which the sources of $VDD_{RF}$ and the system clock (e.g., SMPS1 and the oscillator 212, respectively) are powered down during the sleep mode, in accordance with certain aspects of the present disclosure. The plot 400 illustrates that the PMU may function in a similar manner as in the plot 300 at the beginning of entering the sleep mode. In plot 400, however, SMPS1 and the oscillator LDO regulator 210 are powered down at time $t_a$, causing $VDD_{RF}$ to ramp down (e.g., as a capacitor (not shown) at the output of SMPS1 discharges) and effectively disabling the oscillator 212, thereby stopping the clock signal during the sleep mode. Also at time $t_a$, the AON LDO 208 starts to work directly under the battery voltage from the coin cell battery 202. For certain aspects, the power supply input 228 of the AON LDO 208 is switched to VBAT (e.g., the third terminal 222 of switch S1 is coupled to the first terminal 220).

Starting from time $t_a$, the AON LDO 208 may be operated in a discontinuous conduction mode (DCM). To operate in the DCM, two low-power comparators (e.g., low-power comparators 504, 506 of FIG. 5) in the AON LDO 208 may be enabled. The thresholds of the two comparators may be slightly skewed, and the two comparator output bits may be used to bound the LDO output (e.g., $VDD_{AON}$) within a voltage window that is set by the two thresholds (e.g., two offset reference voltages Vref_h and Vref_l). For certain aspects, transistor M3 is enabled during the sleep mode when the LDO output is about to be lower than the lower threshold (e.g., Vref_l). For certain aspects, the AON LDO 208 may be idle when the LDO output is about to be higher than the higher threshold (e.g., Vref_h). The length of the time window when the pass transistor is enabled can be adjusted by software, for example.

To exit the sleep mode, SMPS1 may be powered on and start to ramp up its output voltage $VDD_{RF}$ at time $t_b$. After $VDD_{RF}$ reaches its low power mode voltage level, the comparators (and/or other aspects of the circuit in FIG. 5) may be disabled, such that the AON LDO 208 exits the DCM, and switch S2 may be closed at time $t_c$, such that the output of the AON LDO 208 and the output of SMPS1 are effectively shorted together (e.g., $VDD_{AON}$ tracks $VDD_{RF}$), similar to the first sleep mode scenario. After a delay, the SMPS1 may exit its low power mode, the AON LDO 208 may be enabled (e.g., by the En1 signal at the amplifier 236), and switch S2 may be opened (e.g., controlled by the logic 226). In some cases, switch S2 may be opened after a delay (e.g., delay $\Delta t_2$) from the start of $VDD_{RF}$ ramping back up from the low power mode. Once switch S2 is opened, the output of the AON LDO 208 ($VDD_{AON}$) is no longer effectively shorted to the output of SMPS1 ($VDD_{RF}$), and the two signals have different voltage levels, as shown.

Figure 5:
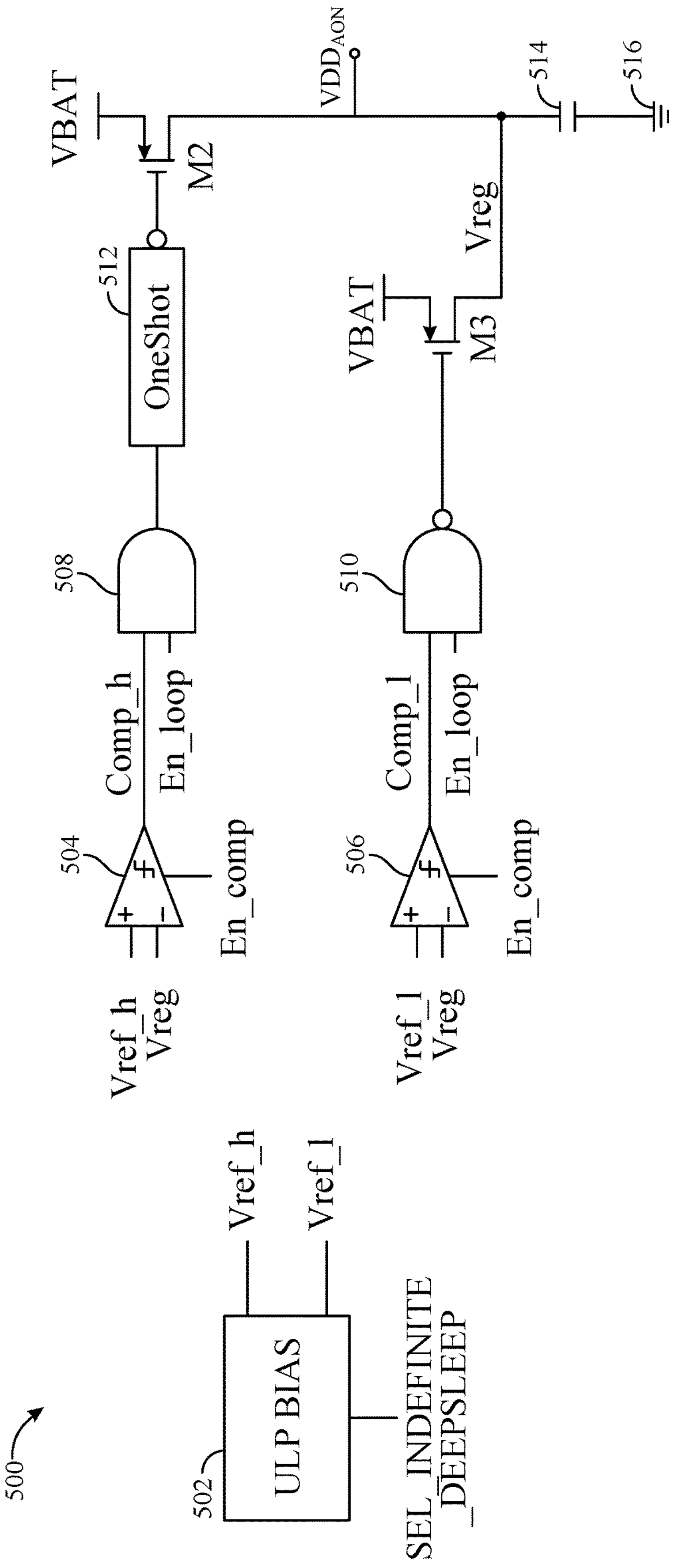
FIG. 5 is a block diagram of an example circuit for operating the AON LDO in discontinuous conduction mode (DCM), in accordance with certain aspects of the present disclosure.

FIG. 5 is a block diagram of an example circuit 500 for operating the AON LDO 208 in the discontinuous conduction mode (DCM), in accordance with certain aspects of the present disclosure. The circuit 500 may include an ultra-low power (ULP) bias circuit 502, low-power comparators 504, 506, logic 508, 510, a pulse generator 512 (labeled "One-Shot"), transistor M2, transistor M3, and a capacitive element 514. The ULP bias circuit 502 may be implemented as a low-power bandgap reference (e.g., part of the PMU 200), which may generate two offset reference voltages: Vref_h and Vref_l. The ULP bias circuit 502 may have a control input (e.g., labeled "SEL_INDEFINITE_DEEPSLEEP"), which may be used to enable or disable the two reference voltages (e.g., Vref_h and Vref_l) generated by the ULP bias circuit 502. Vref_h is slightly higher than Vref_l (e.g., by tens to hundreds of millivolts). The two low-power comparators 504, 506 may compare the regulated output voltage (Vreg, where Vreg=$VDD_{AON}$) of the AON LDO 208 against the two reference voltages and create two one-bit outputs (Comp_h and Comp_l), as illustrated. The pulse generator 512 may be implemented as a one-shot pulse generator or any other suitable pulse generator and may have a programmable pulse width.

Transistor M2 (implemented by a p-type field-effect transistor (PFET)) may have a source coupled to the first port 214 of the PMU 200 and a drain coupled to the output of the AON LDO 208 ($VDD_{AON}$). Transistor M3 (implemented by a PFET) may also have a source coupled to the first port 214 of the PMU 200 and a drain coupled to the output of the AON LDO 208. Transistor M3 may have a tunable transistor size.

The comparator 504 may have a first input coupled to a first reference voltage node with the higher reference voltage Vref_h from the ULP bias circuit 502 and a second input coupled to the output of the AON LDO 208 (labeled "Vreg" in FIG. 5). The logic 508, which may be implemented as an AND gate, may have a first input coupled to an output of the comparator 504 (labeled "Comp_h") and a second input coupled to an enable node (labeled "En_loop"). The pulse generator 512 may have an input coupled to an output of the logic 508 and an output coupled to a gate of transistor M2. The comparator 506 may have a first input coupled to a second reference voltage node with the lower reference voltage Vref_l from the ULP bias circuit 502 and a second input coupled to the output of the AON LDO 208 (Vreg=$VDD_{AON}$). The logic 510, which may be implemented as a NAND gate, may have a first input coupled to an output of the comparator 506 (labeled "Comp_l") and a second input coupled to the enable node (configured to receive the En_loop signal). The logic 510 may have an output coupled to a gate of transistor M3. The comparators 504, 506 may each have a control input (labeled "En_comp"), which may be controlled by the logic 226 to enable and disable the comparators.

The capacitive element 514 may be coupled between the output of the AON LDO 208 and a reference potential node 516 (e.g., electrical ground). The capacitive element 514 may be implemented by one or more capacitors having a total capacitance of about 1 μF capacitor, for example.

In the second sleep mode scenario, as described above with respect to FIG. 4, SMPS1 may be disabled, and $VDD_{AON}$ at the output of the AON LDO 208 may be higher than a first reference voltage (Vref_h) on the first reference voltage node. In this case, the AON LDO 208 may be configured to be idle. That is, if Vreg>Vref_h, (Comp_h, Comp_l)=(0, 0), and the AON LDO 208 is idle (e.g., basically no current consumption in the AON LDO 208 except for the low-power comparators 504, 506).

In another case during the second sleep mode scenario, SMPS1 may be disabled, and $VDD_{AON}$ may be lower than the first reference voltage (Vref_h), but higher than a second reference voltage (Vref_l) on the second reference voltage node. In this case, Comp_h is logic high, Comp_l is logic low, and the logic 508 may be configured to trigger the pulse generator 512 to generate an output pulse, which momentarily turns on the transistor M2 for a time interval $\Delta t_3$ (e.g., the time length of the pulse) to charge the capacitive element 514 from the coin cell battery 202 (e.g., through the voltage node labeled "VBAT") during the time interval $\Delta t_3$ and increase the voltage at the output of the AON LDO 208. That is, if Vref_l<Vreg<Vref_h, (Comp_h, Comp_l)=(1, 0), and transistor M2, which is driven by a pulse from the pulse generator 512, may be briefly activated to charge the capacitive element 514 and increase Vreg (=$VDD_{AON}$).

In yet another case during the second sleep mode scenario, SMPS1 may be disabled, and $VDD_{AON}$ may be lower than the second reference voltage (Vref_l). In this case, Comp_h is logic high, Comp_l is logic high, and the logic 510 may be configured to turn on transistor M3 to charge the capacitive element 514 from the coin cell battery 202 (e.g., through the voltage node labeled "VBAT") and increase the voltage at the output of the AON LDO 208. The capacitive element 514 may be charged continuously until $VDD_{AON}$ (=Vreg) is increased above the second reference voltage (Vref_l). That is, when (Comp_h, Comp_l)=(1, 1), transistor M3, driven by the logic 510, provides most of the charge for the capacitive element 514.

In certain aspects, the PMU 200 (e.g., logic 226 in the PMU 200) may be configured to determine a length of a period during which the AON LDO 208 is configured to be idle during the sleep mode of the IC and adjust a length of the time interval based on the length of the period. The PMU 200 may be configured to count a number of falling or rising edges of a clock signal associated with the sleep mode of the IC (e.g., clock signal from the oscillator 212), while the AON LDO 208 is configured to be idle during the sleep mode of the IC. In these aspects, the PMU 200 may be configured to adjust a length of the time interval based on the counted number of the falling or rising edges of the clock signal.

With these techniques described above for certain aspects of the present disclosure, after a cold boot, the AON LDO 208 consumes minimum, or at least reduced, current throughout different system configurations, including two sleep mode scenarios. Particularly in the second sleep mode scenario, operations in event-driven fashion result in very low power consumption (e.g., typical current consumption is 0.3 μA including bandgap circuit), without requiring a system sleep clock. Furthermore, functionality may be maintained over a wide battery voltage range between 3.6 V and 1.8 V.

According to certain aspects, when the system sleep clock is available, the system sleep clock may be used to count the time period when (Comp_h, Comp_l)=(0, 0) during a sleep time duration. The result of the count (e.g., the count value) may be used to adjust a pulse width of the pulse generator (e.g., the pulse generator 512) for the next sleep cycle. For example, when the count value is large for a given load current of the AON LDO 208, this indicates that the current pulse generator pulse width is too large, which may result in a large Vreg ripple. The Vreg ripple may be reduced in the next sleep cycle by lowering the pulse width of the pulse generator. In another example, when the count value is small or zero for a load current of the AON LDO, this indicates that the current pulse generator pulse width is too small, which may result in a lower average AON LDO output voltage (e.g., a smaller margin of robust AON LDO functionality). In this case, the pulse generator pulse width may be increased in the next sleep cycle.

Example Power Management Operations

Figure 6:
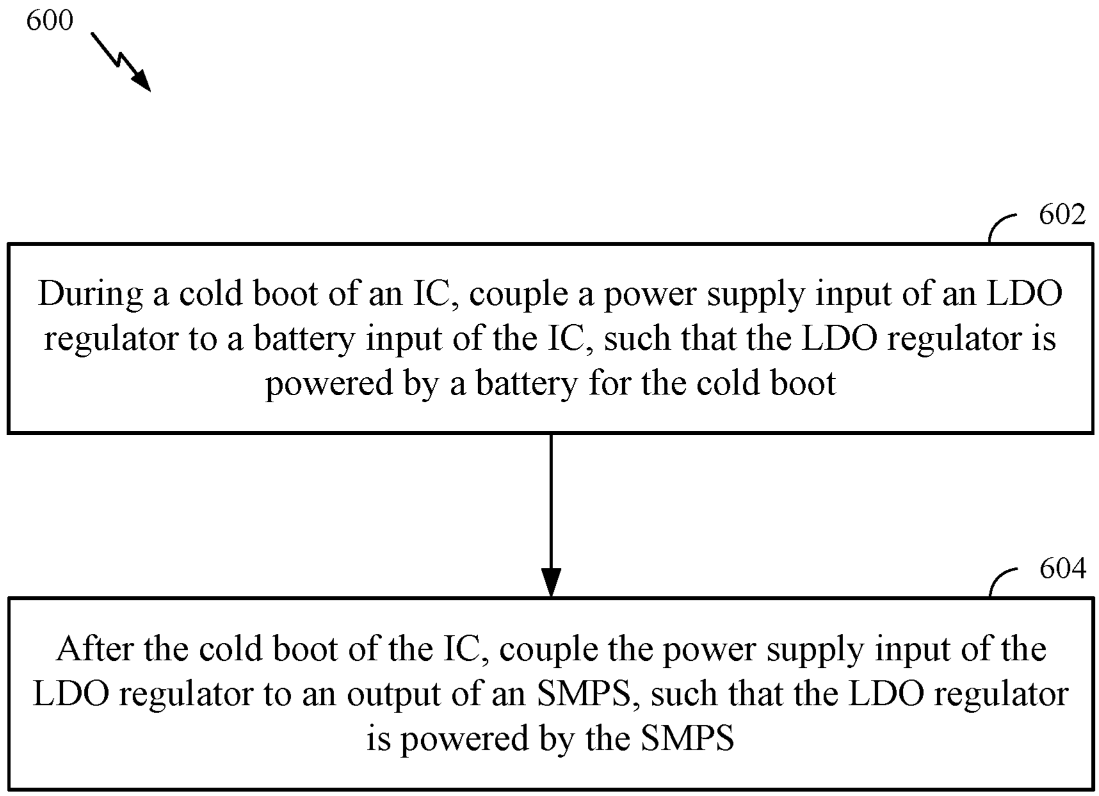
FIG. 6 is a flow diagram depicting example operations for managing power in an integrated circuit (IC) that includes an LDO and a switched-mode power supply (SMPS), in accordance with certain aspects of the present disclosure.

FIG. 6 is a flow diagram depicting example operations 600 for managing power in an integrated circuit (IC), in accordance with certain aspects of the present disclosure.

The IC includes an LDO regulator (e.g., AON LDO 208) and a SMPS (e.g., SMPS1 204). The operations 600 may be performed by a PMU (e.g., PMU 200) included in the IC.

The operations 600 may begin, at block 602, with the IC coupling, during a cold boot of the IC, a power supply input (e.g., power supply input 228 or the source of transistor M1) of the LDO regulator to a battery input (e.g., first port 214) of the IC, such that the LDO regulator is powered by a battery (e.g., coin cell battery 202) for the cold boot.

At block 604, after the cold boot of the IC, the IC may couple the power supply input of the LDO regulator to an output (e.g., $VDD_{RF}$) of the SMPS, such that the LDO regulator is powered by the SMPS.

According to certain aspects, the operations 600 may further include entering a sleep mode of the IC. In these aspects, when an output voltage from the SMPS (e.g., $VDD_{RF}$) is available, entering the sleep mode may include coupling the power supply input of the LDO regulator to the output of the SMPS, closing a switch (e.g., switch S2) to bypass a pass transistor (e.g., transistor M1) of the LDO regulator, and disabling the LDO regulator (e.g., via the En1 signal). In some cases, entering the sleep mode of the IC may further include boosting the output voltage from the SMPS before closing the switch and, after the boosting, causing the SMPS to enter a low power mode for a duration of the sleep mode. In certain aspects, the operations 600 further include exiting the sleep mode of the IC. Exiting the sleep mode of the IC may include opening the switch and enabling the LDO regulator. In some cases, exiting the sleep mode of the IC may further include causing the SMPS to exit from a low power mode and to enter a pulse-frequency modulation (PFM) mode or a pulse-width modulation (PWM) mode before opening the switch.

In certain aspects, during a sleep mode of the IC, if the SMPS is disabled and a voltage at the output of the LDO regulator (e.g., output rail voltage $VDD_{AOD}$) is: (i) higher than a first reference voltage (e.g., Vref_h), then the LDO regulator is configured to be idle; (ii) lower than the first reference voltage, but higher than a second reference voltage (e.g., Vref_l), then a capacitive element (e.g., capacitive element 514) coupled to the output of LDO regulator is charged from the battery during a time interval (e.g., time interval $\Delta t_3$) to increase the voltage at the output of the LDO regulator; or (iii) lower than the second reference voltage, then the capacitive element is charged from the battery to increase the voltage at the output of the LDO regulator. In these aspects, the second reference voltage is lower than the first reference voltage. In certain aspects, the operations 600 may further include determining a length of a period during which the LDO regulator is configured to be idle during the sleep mode of the IC and adjusting a length of the time interval based on the length of the period. In certain aspects, the operations 600 may further include counting a number of falling or rising edges of a clock signal (e.g., generated from the output of the oscillator 212) associated with the sleep mode of the IC, while the LDO regulator is configured to be idle during the sleep mode of the IC, and adjusting a length of the time interval based on the counted number of the falling or rising edges of the clock signal.

Example Aspects

In addition to the various aspects described above, specific combinations of aspects are within the scope of the present disclosure, some of which are detailed below:

Aspect 1: An integrated circuit (IC) for power management, the IC comprising: a first port for coupling to a battery; a second port; a switched-mode power supply (SMPS) including a power supply input coupled to the second port; and a low-dropout (LDO) regulator including a power supply input selectively coupled to the first port or to an output of the SMPS.

Aspect 2: The IC of Aspect 1, further comprising a switch including a first terminal coupled to the first port, a second terminal coupled to the output of the SMPS, and a third terminal coupled to the power supply input of the LDO regulator, wherein the switch is configured to selectively couple the first terminal or the second terminal to the third terminal.

Aspect 3: The IC of Aspect 2, wherein during a cold boot of the IC, the switch is configured to couple the first terminal to the third terminal, such that the LDO regulator is configured to be powered by the battery.

Aspect 4: The IC of Aspect 3, wherein during the cold boot of the IC, the SMPS is configured to be enabled after the LDO regulator is enabled.

Aspect 5: The IC of Aspects 3 or 4, wherein after the cold boot of the IC, the switch is configured to couple the second terminal to the third terminal, such that the LDO regulator is configured to be powered by the SMPS.

Aspect 6: The IC of Aspect 1, wherein the LDO regulator comprises: a transistor; and a switch including a first terminal coupled to a source of the transistor and a second terminal coupled to a drain of the transistor.

Aspect 7: The IC of Aspect 6, wherein to enter a sleep mode of the IC, when an output voltage from the SMPS is available, the power supply input of the LDO regulator is coupled to the output of the SMPS, the switch is configured to be closed to bypass the transistor, and the LDO regulator is configured to be disabled.

Aspect 8: The IC of Aspect 7, wherein to enter the sleep mode of the IC, the switch is configured to be closed after a delay.

Aspect 9: The IC of Aspect 8, wherein to enter the sleep mode of the IC, the SMPS is configured to: boost the output voltage from the SMPS before the switch is configured to be closed; and enter a low power mode, after boosting the output voltage from the SMPS, for a duration of the sleep mode.

Aspect 10: The IC of Aspect 6, wherein to exit a sleep mode of the IC, the switch is configured to be open, and the LDO regulator is configured to be enabled.

Aspect 11: The IC of Aspect 10, wherein to exit the sleep mode of the IC, the switch is configured to be open after a delay.

Aspect 12: The IC of Aspect 10 or 11, wherein to exit the sleep mode of the IC, the SMPS is configured to exit from a lower power mode and enter a pulse-frequency modulation (PFM) mode or a pulse-width modulation (PWM) mode, before the switch is configured to be open.

Aspect 13: The IC according to any of Aspects 1-4, further comprising: a transistor having a source coupled to the first port and having a drain coupled to an output of the LDO regulator; a second transistor having a source coupled to the first port and having a drain coupled to the output of the LDO regulator; a first comparator having a first input coupled to a first reference voltage node and having a second input coupled to the output of the LDO regulator; first logic coupled between an output of the first comparator and a gate of the first transistor; a second comparator having a first input coupled to a second reference voltage node and having a second input coupled to the output of the LDO regulator, wherein the first reference voltage node is configured to have a higher voltage than the second reference voltage node; and second logic coupled between an output of the second comparator and a gate of the second transistor.

Aspect 14: The IC of Aspect 13, wherein the first logic comprises: a logical AND gate having a first input coupled to the output of the first comparator and having a second input coupled to an enable node; and a pulse generator having an input coupled to an output of the logical AND gate and an output coupled to the gate of the first transistor.

Aspect 15: The IC of Aspect 14, wherein the pulse generator is configured to output a pulse with a programmable pulse width.

Aspect 16: The IC according to any of Aspects 13-15, wherein the second logic comprises a logical NAND gate having a first input coupled to the output of the second comparator, having a second input coupled to an enable node, and having an output coupled to the gate of the second transistor.

Aspect 17: The IC according to any of Aspects 13-16, wherein the second transistor has a tunable transistor size.

Aspect 18: The IC according to any of Aspects 13-17, further comprising a capacitive element coupled to the output of the LDO regulator, wherein during a sleep mode of the IC, if the SMPS is disabled and a voltage at the output of the LDO regulator is: higher than a first reference voltage on the first reference voltage node, then the LDO regulator is configured to be idle; lower than the first reference voltage, but higher than a second reference voltage on the second reference voltage node, then the first logic is configured to turn on the first transistor for a time interval to charge the capacitive element from the battery during the time interval and increase the voltage at the output of the LDO regulator; or lower than the second reference voltage, then the second logic is configured to turn on the second transistor to charge the capacitive element from the battery and increase the voltage at the output of the LDO regulator.

Aspect 19: The IC of Aspect 18, wherein the IC is configured to: determine a length of a period during which the LDO regulator is configured to be idle during the sleep mode of the IC; and adjust a length of the time interval based on the length of the period.

Aspect 20: The IC of Aspect 18 or 19, wherein the IC is configured to: count a number of falling or rising edges of a clock signal associated with the sleep mode of the IC, while the LDO regulator is configured to be idle during the sleep mode of the IC; and adjust a length of the time interval based on the counted number of the falling or rising edges of the clock signal.

Aspect 21: The IC according to any of Aspects 1-20, wherein the second port is the same as the first port.

Aspect 22: A method of using, operating, or forming an IC or a device according to any of Aspects 1-21.

Aspect 23: A method for managing power in an integrated circuit (IC) comprising a low-dropout (LDO) regulator and a switched-mode power supply (SMPS), the method comprising: during a cold boot of the IC, coupling a power supply input of the LDO regulator to a battery input of the IC, such that the LDO regulator is powered by a battery for the cold boot; and after the cold boot of the IC, coupling the power supply input of the LDO regulator to an output of the SMPS, such that the LDO regulator is powered by the SMPS.

Aspect 24: The method of Aspect 23, further comprising entering a sleep mode of the IC, wherein when an output voltage from the SMPS is available, entering the sleep mode comprises: coupling the power supply input of the LDO regulator to the output of the SMPS; closing a switch to bypass a pass transistor of the LDO regulator; and disabling the LDO regulator.

Aspect 25: The method of Aspect 24, wherein entering the sleep mode of the IC further comprises: boosting the output voltage from the SMPS before closing the switch; and after the boosting, causing the SMPS to enter a low power mode for a duration of the sleep mode.

Aspect 26: The method of Aspect 24 or 25, further comprising exiting the sleep mode of the IC, wherein exiting the sleep mode of the IC comprises: opening the switch; and enabling the LDO regulator.

Aspect 27: The method of Aspect 26, wherein exiting the sleep mode of the IC further comprises causing the SMPS to exit from a low power mode and to enter a pulse-frequency modulation (PFM) mode or a pulse-width modulation (PWM) mode before opening the switch.

Aspect 28: The method of any of Aspects 23 to 27, wherein during a sleep mode of the IC, if the SMPS is disabled and a voltage at the output of the LDO regulator is: higher than a first reference voltage, then the LDO regulator is configured to be idle; lower than the first reference voltage, but higher than a second reference voltage, then a capacitive element coupled to the output of LDO regulator is charged from the battery during a time interval to increase the voltage at the output of the LDO regulator; or lower than the second reference voltage, then the capacitive element is charged from the battery to increase the voltage at the output of the LDO regulator, wherein the second reference voltage is lower than the first reference voltage.

Aspect 29: The method of Aspect 28, further comprising: determining a length of a period during which the LDO regulator is configured to be idle during the sleep mode of the IC; and adjusting a length of the time interval based on the length of the period.

Aspect 30: The method of Aspect 28 or 29, further comprising: counting a number of falling or rising edges of a clock signal associated with the sleep mode of the IC, while the LDO regulator is configured to be idle during the sleep mode of the IC; and adjusting a length of the time interval based on the counted number of the falling or rising edges of the clock signal.

Additional Considerations

The various operations of methods described above may be performed by any suitable means capable of performing the corresponding functions. The means may include various hardware and/or software component(s) and/or module(s), including, but not limited to a circuit, an application-specific integrated circuit (ASIC), or a processor. Generally, where there are operations illustrated in figures, those operations may have corresponding counterpart means-plus-function components with similar numbering.

As used herein, the term “determining” encompasses a wide variety of actions. For example, “determining” may include calculating, computing, processing, deriving, investigating, looking up (e.g., looking up in a table, a database, or another data structure), ascertaining, and the like. Also, “determining” may include receiving (e.g., receiving information), accessing (e.g., accessing data in a memory), and the like. Also, “determining” may include resolving, selecting, choosing, establishing, and the like.

As used herein, a phrase referring to “at least one of” a list of items refers to any combination of those items, including single members. As an example, “at least one of: a, b, or c” is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An integrated circuit (IC) for power management, the IC comprising:

a first port for coupling to a battery;

a second port different than the first port;

a switched-mode power supply (SMPS) including a power supply input coupled to the second port;

a low-dropout (LDO) regulator including a power supply input selectively coupled to the first port or to an output of the SMPS; and a switch including a first terminal coupled to the first port, a second terminal coupled to the output of the SMPS, and a third terminal coupled to the power supply input of the LDO regulator, wherein the switch is configured to selectively couple the first terminal or the second terminal to the third terminal and wherein during a cold boot of the IC, the switch is configured to couple the first terminal to the third terminal, such that the LDO regulator is configured to be powered by the battery.

2. The IC of claim 1, wherein during the cold boot of the IC, the SMPS is configured to be enabled after the LDO regulator is enabled.

3. The IC of claim 1, wherein after the cold boot of the IC, the switch is configured to couple the second terminal to the third terminal, such that the LDO regulator is configured to be powered by the SMPS.

4. The IC of claim 1, wherein the LDO regulator comprises:

a transistor; and another switch including a first terminal coupled to a source of the transistor and a second terminal coupled to a drain of the transistor.

5. The IC of claim 4, wherein to exit a sleep mode of the IC, the switch is configured to be open and the LDO regulator is configured to be enabled.

6. The IC of claim 5, wherein to exit the sleep mode of the IC, the switch is configured to be open after a delay.

7. The IC of claim 5, wherein to exit the sleep mode of the IC, the SMPS is configured to exit from a lower power mode and enter a pulse-frequency modulation (PFM) mode or a pulse-width modulation (PWM) mode, before the switch is configured to be open.

8. An integrated circuit (IC) for power management, the IC comprising:

a first port for coupling to a battery;

a second port different than the first port;

a switched-mode power supply (SMPS) including a power supply input coupled to the second port;

a low-dropout (LDO) regulator including a power supply input selectively coupled to the first port or to an output of the SMPS;

a transistor; and a switch including a first terminal coupled to a source of the transistor and a second terminal coupled to a drain of the transistor, wherein to enter a sleep mode of the IC, when an output voltage from the SMPS is available, the power supply input of the LDO regulator is coupled to the output of the SMPS, the switch is configured to be closed to bypass the transistor, and the LDO regulator is configured to be disabled.

9. The IC of claim 8, wherein to enter the sleep mode of the IC, the switch is configured to be closed after a delay.

10. The IC of claim 9, wherein to enter the sleep mode of the IC, the SMPS is configured to:

boost the output voltage from the SMPS before the switch is configured to be closed; and enter a low power mode, after boosting the output voltage from the SMPS, for a duration of the sleep mode.

11. An integrated circuit (IC) for power management, the IC comprising:

a first port for coupling to a battery;

a second port different than the first port;

a switched-mode power supply (SMPS) including a power supply input coupled to the second port;

a low-dropout (LDO) regulator including a power supply input selectively coupled to the first port or to an output of the SMPS;

a first transistor having a source coupled to the first port and having a drain coupled to an output of the LDO regulator;

a second transistor having a source coupled to the first port and having a drain coupled to the output of the LDO regulator;

a first comparator having a first input coupled to a first reference voltage node and having a second input coupled to the output of the LDO regulator;

first logic coupled between an output of the first comparator and a gate of the first transistor;

a second comparator having a first input coupled to a second reference voltage node and having a second input coupled to the output of the LDO regulator, wherein the first reference voltage node is configured to have a higher voltage than the second reference voltage node; and second logic coupled between an output of the second comparator and a gate of the second transistor.

12. The IC of claim 11, wherein the first logic comprises:

a logical AND gate having a first input coupled to the output of the first comparator and having a second input coupled to an enable node; and a pulse generator having an input coupled to an output of the logical AND gate and an output coupled to the gate of the first transistor.

13. The IC of claim 12, wherein the pulse generator is configured to output a pulse with a programmable pulse width.

14. The IC of claim 11, wherein the second logic comprises a logical NAND gate having a first input coupled to the output of the second comparator, having a second input coupled to an enable node, and having an output coupled to the gate of the second transistor.

15. The IC of claim 11, wherein the second transistor has a tunable transistor size.

16. The IC of claim 11, further comprising a capacitive element coupled to the output of the LDO regulator, wherein during a sleep mode of the IC, if the SMPS is disabled and a voltage at the output of the LDO regulator is:

higher than a first reference voltage on the first reference voltage node, then the LDO regulator is configured to be idle;

lower than the first reference voltage, but higher than a second reference voltage on the second reference voltage node, then the first logic is configured to turn on the first transistor for a time interval to charge the capacitive element from the battery during the time interval and increase the voltage at the output of the LDO regulator; or lower than the second reference voltage, then the second logic is configured to turn on the second transistor to charge the capacitive element from the battery and increase the voltage at the output of the LDO regulator.

17. The IC of claim 16, wherein the IC is configured to:

determine a length of a period during which the LDO regulator is configured to be idle during the sleep mode of the IC; and adjust a length of the time interval based on the length of the period.

18. The IC of claim 16, wherein the IC is configured to:

count a number of falling or rising edges of a clock signal associated with the sleep mode of the IC, while the LDO regulator is configured to be idle during the sleep mode of the IC; and adjust a length of the time interval based on the counted number of the falling or rising edges of the clock signal.

19. A method for managing power in an integrated circuit (IC) comprising a low-dropout (LDO) regulator and a switched-mode power supply (SMPS), the method comprising:

during a cold boot of the IC, coupling a power supply input of the LDO regulator to a battery input of the IC, such that the LDO regulator is powered by a battery for the cold boot; and after the cold boot of the IC, coupling the power supply input of the LDO regulator to an output of the SMPS, such that the LDO regulator is powered by the SMPS.

20. The method of claim 19, further comprising entering a sleep mode of the IC, wherein when an output voltage from the SMPS is available, entering the sleep mode comprises:

coupling the power supply input of the LDO regulator to the output of the SMPS;

closing a switch to bypass a pass transistor of the LDO regulator; and disabling the LDO regulator.

21. The method of claim 20, wherein entering the sleep mode of the IC further comprises:

boosting the output voltage from the SMPS before closing the switch; and after the boosting, causing the SMPS to enter a low power mode for a duration of the sleep mode.

22. The method of claim 20, further comprising exiting the sleep mode of the IC, wherein exiting the sleep mode of the IC comprises:

opening the switch; and enabling the LDO regulator.

23. The method of claim 22, wherein exiting the sleep mode of the IC further comprises causing the SMPS to exit from a low power mode and to enter a pulse-frequency modulation (PFM) mode or a pulse-width modulation (PWM) mode before opening the switch.

24. The method of claim 19, wherein during a sleep mode of the IC, if the SMPS is disabled and a voltage at the output of the LDO regulator is:

higher than a first reference voltage, then the LDO regulator is configured to be idle;

lower than the first reference voltage, but higher than a second reference voltage, then a capacitive element coupled to the output of LDO regulator is charged from the battery during a time interval to increase the voltage at the output of the LDO regulator; or lower than the second reference voltage, then the capacitive element is charged from the battery to increase the voltage at the output of the LDO regulator, wherein the second reference voltage is lower than the first reference voltage.

25. The method of claim 24, further comprising:

determining a length of a period during which the LDO regulator is configured to be idle during the sleep mode of the IC; and adjusting a length of the time interval based on the length of the period.

26. The method of claim 24, further comprising:

counting a number of falling or rising edges of a clock signal associated with the sleep mode of the IC, while the LDO regulator is configured to be idle during the sleep mode of the IC; and adjusting a length of the time interval based on the counted number of the falling or rising edges of the clock signal.

* * * * *